UNITED STATES PATENT OFFICE.

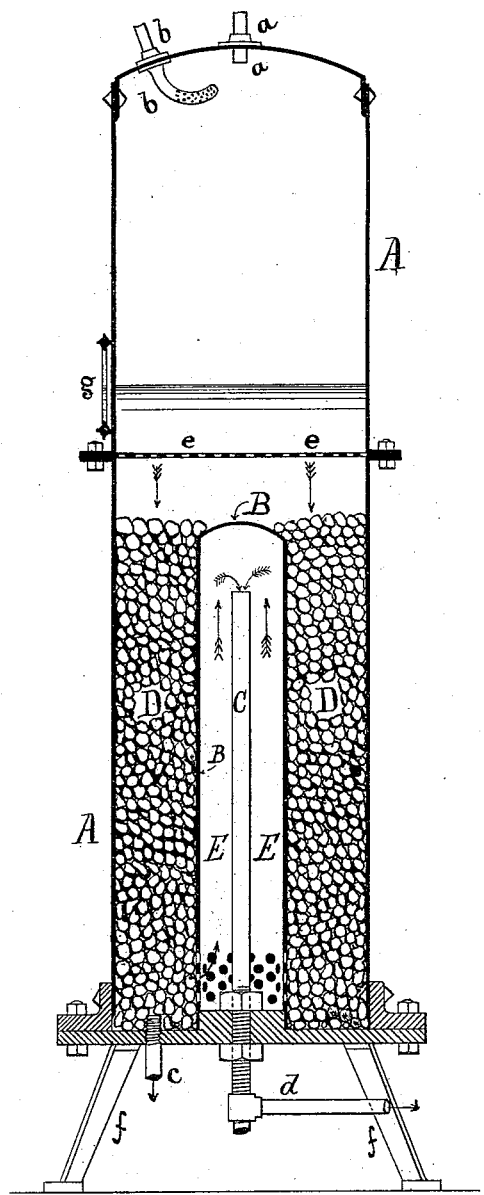

JAMES MAHONY, OF NEW YORK, N. Y.

FEED-WATER HEATER.

SPECIFICATION forming part of Letters Patent No. 336,929, dated March 2, 1886.

Application filed December 2, 1885. Serial No. 184,384. (No model.)

*To all whom it may concern:*

Be it known that I, JAMES MAHONY, a citizen of the United States, residing in the city, county, and State of New York, have invented certain new and useful Improvements in Feed-Water Heaters and Clarifiers, of which the following is a specification, reference being had to the accompanying drawing.

Certain improvements consist in the construction and combination, within the shell of a feed-water heater, of an inverted cylinder or pipe, closed, when in place, at the top or upper portion, and having a lower opening provided with perforations, foramina, wire-gauze, or equivalent screening formation at the bottom portion, through which the feed-water is intended to pass in its route to boiler, also a filtering, purifying, or clarifying chamber located between the said shell and the inverted cylinder or pipe, with an upright reservoir or stand-pipe situated within said inverted cylinder, from which the supply is delivered to the boiler.

Certain other improvements consist in the construction, erection, and combination, within the shell of a feed-water heater, of a steam-connection communicating with the steam-space of a boiler or generator or the exhaust-space of a steam-space of an engine, machine, or other device using steam; of a spray-pipe admitting feed-water to the upper portion of the shell of the heater; of a filtering, purifying, or clarifying chamber formed between the shell of the heater and the inverted cylinder or chamber; of a screen, perforated plate, or piece of wire-gauze placed and attached to confine the filtering, purifying, or clarifying material or medium within and to its arranged chamber, and an internal or final reservoir located within the inverted chamber or pipe, through which the feed-water in its cleansed, purified, or clarified state is delivered to the boiler or such other appliance requiring pure water.

The accompanying drawing represents a heater embodying my improvement.

In such drawing, A designates the shell; B, the internal inverted chamber or pipe, closed at the top or upper portion, and having perforations, foramina, wire-gauze, or equivalent inlet formations at the bottom thereof.

C designates an internal reservoir or stand-pipe, through which the feed water is delivered or has passage direct to the boiler.

D designates the filtering chamber or space within which is placed the filtering, clarifying, or purifying material or devices.

E designates a space or chamber between the stand-pipe or reservoir C and the inverted pipe or chamber B, which may be filled or not with purifying, clarifying, or filtering material.

*a* designates an inlet for live or exhaust steam, varying in size, as the case may be.

*b* designates a passage or inlet for water, which passage or inlet may be perforated or be provided with any of the well-known spray-nozzles.

*c* designates a blow-outlet for cleansing the filtering or purifying material.

*d* designates a feed-water attachment leading to boiler or equivalent.

*e* designates a screen of perforated or gauze material for confining the filtering material to its place and permitting feed-water to drain through and reach the filtering-chamber, as well as assisting in collecting refuse matter or material from the water passing through. Such screen may be omitted, if deemed desirable, since the heater-purifier is not moved after being put in place, and no real injury would be done from the slight movement or displacement of the material or medium, since on being put in position the medium or material would find its level again.

*f* designates the legs or supports; *g*, the water gages or glasses.

In the operation of this device as a feed-water heater either live or exhaust steam is admitted at *a* and water is admitted at *b*, and, being sprayed, is disintegrated and mingles with the steam, becomes heated, and drops or deposits its contained foreign or vegetable particles at once. The water then passes through the filtering-chamber D, where it is filtered, clarified, and purified, thence through the openings at bottom of inverted pipe or chamber B, up the space or chamber E, and, overflowing, enters the stand-pipe or reservoir C, whence it reaches the boiler.

What I claim as new, and desire to secure by Letters Patent, is—

1. A feed-water heater, purifier, and clarifier formed of an outer shell, an inner tube or inverted pipe closed at the upper end and open at lower end, a filtering-chamber formed or located between said shell and inner pipe, and an internal reservoir within the said inner tube or inverted pipe, into which the water or medium passes for delivery, substantially as shown and described.

2. A feed-water heater, purifier, and clarifier having a vertical shell, a pipe within having its upper portion closed and lower portion open, and provided with perforations, foramina, or wire-gauze, an upright pipe or reservoir into which the feed-water overflows and through which it exits, and an inlet or spray nozzle or pipe through which the entering water is received or supplied, substantially as shown and described.

3. In a feed-water heater, purifier, and clarifier, a vertical shell, a pipe within said shell, having its upper portion closed and its lower portion attached to said shell, and having openings, perforations, foramina, or wire-gauze through which the feed-water passes, a filtering-chamber between the said outer shell and inner perforated pipe, an internal stand-pipe or reservoir into which the water overflows, and an inlet or spray nozzle or pipe, substantially as shown and described.

4. In a feed-water heater and clarifier, a vertical shell, a pipe within said shell, having its upper portion closed and its lower portion attached to said shell, and having openings, perforations, foramina, or wire-gauze through which the feed-water passes, a filtering-chamber between said outer shell and inner perforated pipe, a screen or perforated plate or partition above such filtering-chamber for confining the filtering material or medium to its place, and an internal stand-pipe or reservoir within the upright pipe or cylinder, closed at top, into which the heated and clarified water overflows, substantially as and for the purposes specified.

5. In a feed-water heater and clarifier, the combination of an outer shell, A, the inner stand-pipe, B, closed at the top and having openings at the bottom, the filtering chamber or space D between the outer shell and stand-pipe B, the reservoir or delivery-pipe C, located within pipe B, blow-off or cleansing nozzle c, water-outlet nozzle d, and the perforated inclosing plate or partition e, substantially as shown and described.

6. The combination, in a feed-water heater and clarifier, of an outer shell, A, one or more tubes or cylinders, B, chambers D and E, internal reservoir or stand-pipe, C, and perforated plate or partition e, substantially as shown and described.

JAMES MAHONY.

Witnesses:
Wm. H. Weightman,
John Buckler.